T. W. CROZIER.
NUT LOCKING WASHER.
APPLICATION FILED APR. 30, 1915.
1,150,745.  Patented Aug. 17, 1915.
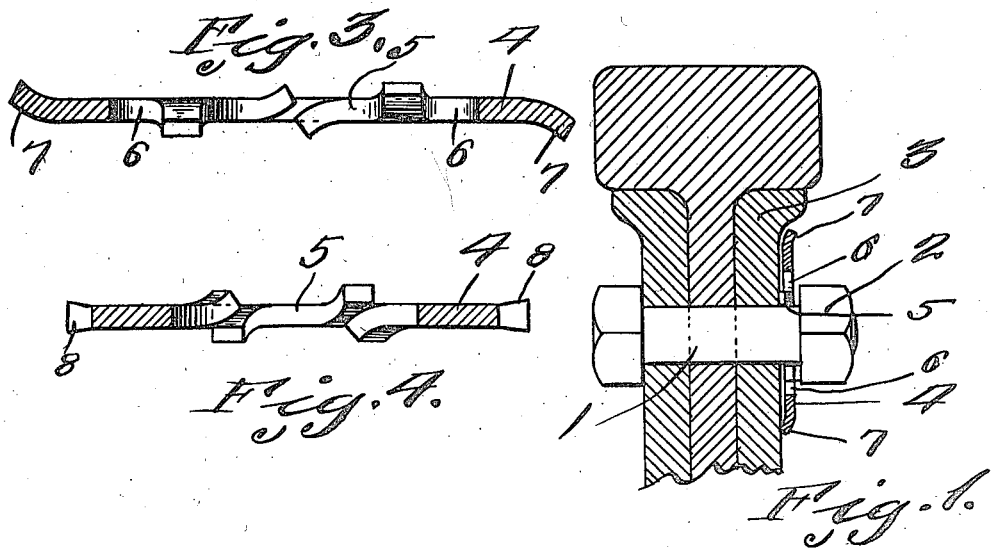
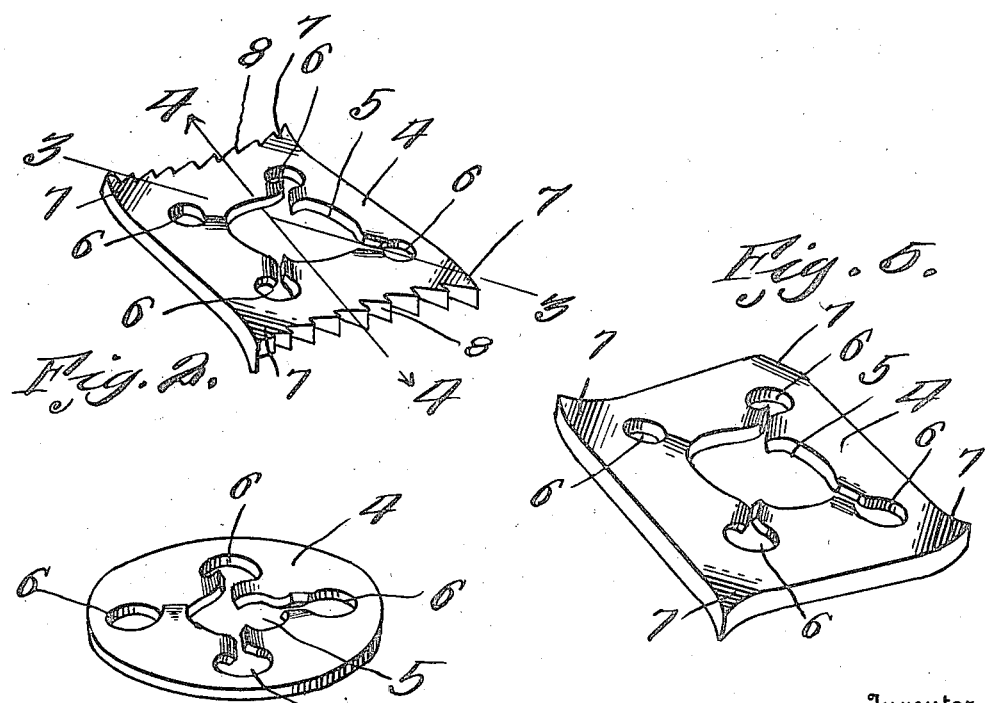

UNITED STATES PATENT OFFICE.

THOMAS WASHINGTON CROZIER, OF CHRISTIANSBURG, VIRGINIA.

NUT-LOCKING WASHER.

1,150,745. Specification of Letters Patent. Patented Aug. 17, 1915.

Application filed April 30, 1915. Serial No. 24,950.

*To all whom it may concern:*

Be it known that I, THOMAS WASHINGTON CROZIER, a citizen of the United States, residing at Christiansburg, in the county of Montgomery and State of Virginia, have invented a new and useful Nut-Locking Washer; and I do hereby declare the following to be a full, clear, and exact description of the invention, such as will enable others skilled in the art to which it appertains to make and use the same.

This invention relates to a new and useful form of bolt or nut locking washer.

An object of the invention is the provision of a plate stamped from some suitable strong and resilient material, for instance steel, and which is provided with a central opening to receive a bolt shank, and supplied with a plurality of smaller openings, formed in the plate at junctions diametrically opposite one another. The material intermediate each of the smaller openings and the major central opening being split, and the opposite portions of the material being deflected in opposite directions forming cutting lips, designed to bite into the material of the members upon opposite sides of the plate, as shown in the drawing, thereby locking the nut and bolt (with which the locking washer coöperates) in place.

Another feature of the invention is the provision of a plate constituting a locking washer, which plate is provided with a plurality of corners, which are deflected, so as to bite into that which is being clamped and the nut on the bolt.

Another feature is to provide one or more of the edges of the plate with serrations or saw teeth, which also bite into the material of that which is being clamped, and the material of the nut.

These foregoing features constitute essential and practical improvements over the nut locking washer set forth, shown and claimed in the Patent No. 1,099,027, issued to Thomas Washington Crozier, June 2, 1914.

In practical fields the details of construction may necessitate alterations, falling within the scope of what is claimed.

The invention comprises further features and combination of parts, as hereinafter set forth, shown in the drawings and claimed.

In the drawings:—Figure 1 is a sectional view through a portion of a rail and the fish plates thereof, illustrating the bolt transversely thereof with a nut applied thereon, with the improved nut locking washer between one of the fish plates and the nut. Fig. 2 is an enlarged detail perspective view of one form of the washer. Fig. 3 is a sectional view through the washer on line 3—3 of Fig. 2. Fig. 4 is a sectional view on line 4—4 of Fig. 2. Fig. 5 is a perspective view of another form of washer. Fig. 6 is a perspective view of a circular form of washer.

Referring to the drawings 1 designates the bolt shank, and 2 the nut, and 3 that which is being clamped between the head of the bolt and the nut, whereas 4 designates the locking washer interposed between 3 and the nut 2. This locking washer consists of a plate, which may be either rectangular, circular or any other suitable shape in plan view. The locking washer has a central bolt opening 5, and is provided with a plurality of additional smaller openings 6. It will be observed that the material between each of the smaller openings (which are disposed at junctions diametrically opposite) and the central bolt opening is split or severed, and the opposite portions of said material are deflected in opposite directions to form cutting or biting lips, to bite into the member 3 which is to be clamped and the nut, thereby preventing displacement of the plate or washer and the nut.

In case the locking washer is constructed square or rectangular, the corners 7 thereof are deflected alternately in opposite directions, to bite into that which is being clamped, and the nut, provided the nut is large enough, to prevent displacement of the plate and the nut. One or more of the edges of the rectangular or square plate or washer are provided with teeth of the character shown at 8, which also bite into that which is clamped, to further assist in preventing displacement of the plate, and to accomplish this result it is to be observed that the outer ends of these teeth are thicker than the thickness of the plate or washer, that is, thicker than where the teeth merge from the plate, in which case the teeth extend beyond the surface of the plate so as to bite into that which is clamped by the bolt and nut. The novel and desirable features of the nut locking washer will be readily noted from the foregoing description, and among these features it may be mentioned that by constructing the sharpened or biting lip next to the bolt opening, that smaller nuts may be used upon the bolt, than can be used in the aforementioned patent, and moreover, such sharpened or biting lips, will not become so easily worn.

The invention having been set forth, what is claimed as new and useful is:—

A nut locking washer comprising a plate provided with a bolt opening extending therethrough, said plate provided with a plurality of apertures spaced from said bolt opening, the material between the apertures and the bolt receiving opening being split or severed, and the opposite portions of said material being struck or deflected out in opposite directions from the plane of said plate forming elongated biting or cutting lips to bite or engage a surface with which the lip contacts, said plate having a plurality of corners, which are deflected alternately in opposite directions from the plane of the plate forming additional biting members to engage a surface with which they contact, said plate being rectangular and having one or more of its edges provided with teeth, the outer portions of which being thicker than where the teeth merge with the edge of the plate.

In testimony whereof I have signed my name to this specification in the presence of two subscribing witnesses.

THOMAS WASHINGTON CROZIER.

Witnesses:
CHAS. I. WADE,
R. M. CHARLTON.